United States Patent [19]
Yamagishi et al.

[11] Patent Number: 5,203,112
[45] Date of Patent: * Apr. 20, 1993

[54] AUTOMATIC DOOR OPERATING SYSTEM

[75] Inventors: Jun Yamagishi; Kouichi Shiota, both of Yokohama, Japan

[73] Assignee: Ohi Seisakusho Co., Ltd., Yokohama, Japan

[*] Notice: The portion of the term of this patent subsequent to May 28, 2008 has been disclaimed.

[21] Appl. No.: 620,404

[22] Filed: Nov. 29, 1990

[30] Foreign Application Priority Data

Nov. 30, 1989 [JP] Japan ............... 1-138044[U]

[51] Int. Cl.[5] ............................................. G05F 15/00
[52] U.S. Cl. ........................................ 49/280; 49/360
[58] Field of Search .................. 49/280, 26, 28, 29, 49/360, 324, 139

[56] References Cited

U.S. PATENT DOCUMENTS

| | | | |
|---|---|---|---|
| 3,938,282 | 2/1976 | Goyal | 49/360 X |
| 4,050,189 | 9/1977 | Peterson | 49/360 X |
| 4,617,757 | 10/1986 | Kagiyama et al. | 49/280 |
| 4,640,050 | 2/1987 | Yamagishi et al. | 49/280 |
| 4,641,067 | 2/1987 | Iizawa et al. | 49/28 X |
| 4,862,640 | 9/1989 | Boyko et al. | 49/280 X |
| 4,945,677 | 8/1990 | Kramer | 49/280 X |
| 5,018,303 | 5/1991 | Koura et al. | 49/360 X |

FOREIGN PATENT DOCUMENTS

3242527-A1  5/1984  Fed. Rep. of Germany.

Primary Examiner—Peter M. Cuomo
Assistant Examiner—Jerry Redman
Attorney, Agent, or Firm—Foley & Lardner

[57] ABSTRACT

An automatic door operating system for a motor vehicle is shown. The system comprises a door closing device which includes an electric motor and a latch plate actuator. The system further includes a control device which, when a latch plate position detecting switch detects a half-latch condition of a latch plate of a door lock device, energizes the motor to run in one direction to turn the latch plate toward a full-latch position and which, when the latch plate position detecting switch detects a full-latch condition of the latch plate, energizes the motor to run in the other direction to turn the latch plate toward a releasing position and which, when a return recognition switch detects the latch plate actuator having returned to its rest position, stops the rotation of the motor in the other direction. The control device includes a control timer which energizes the motor to run in the other direction for a predetermined time from the time on which the control device is energized.

8 Claims, 5 Drawing Sheets

AUTOMATIC DOOR OPERATING SYSTEM

BACKGROUND OF THE INVENTION

1. Field of the Invention

The present invention relates in general to automatic slide door operating systems for a motor vehicle, and more particularly, to automatic slide door operating systems of a type in which when the slide door under closing movement comes to a so-called "half-latch position", a latch plate of a door lock device is forced to turn to its full-latch position thereby to shift the door to a so-called "full-close latched position".

2. Description of the Prior Art

Hitherto, in so-called "one-box" type motor vehicles having slide doors, various types of automatic door operating systems have been proposed and put into practical use for opening and closing the door with the aid of a power device. One of such systems is described U.S. patent application Ser. No. 07/526,653 filed on May 22, 1990, now U.S. Pat. No. 5,018,303, in he names of Soushichi KOURA et al.

The system disclosed in the U.S. Patent Application comprises generally a door moving device which is mounted on a vehicle body for moving the slide door in both directions to open and close a door opening defined by the vehicle body, a door closing device which is mounted on the door for enforcedly shifting the door to a full-close latched position when the door is brought to a half-latch position, a latch cancelling device which is mounted on the door for cancelling the latched condition of the door just before starting of the door opening operation of the door moving device, and a control switch which is mounted near a driver's seat or the door opening for controlling the operation of these devices.

That is, when, with the slide door assuming an open position, the control switch is manipulated to complete one circuit, the door moving device moves the door to the half-latch position and then the door closing device shifts the door to the full-close latched position.

When thereafter the control switch is manipulated to complete the other circuit, the latch cancelling device cancels the latched condition of the closed door and thereafter the door moving device moves the unlatched door from the close position to the open position.

The door moving device and the door closing device are equipped with respective electric motors for producing motive power. That is, when the door is moved to the half-latch position by the motor of the door moving device, the motor of the door closing device is operated to shift the door from the half-latch position to the full-close latched position. The times for which these two motors are under operation are somewhat overwrapped for achieving smooth shifting of the door to the full-close latched position.

In the automatic door operating system of the U.S. Patent Application, there is further employed an electric power feeding system for feeding an electric power from an electric power source (viz., battery) mounted on the vehicle body to the electric devices mounted on the door.

The power feeding system comprises an electric connector which includes a first connector part mounted to the vehicle body and a second connector part mounted to the door. The second connector part is brought into engagement with the first connector part when the door under closing movement comes to a so-called "half-latch position" which is near the full-close latched position of the door. The power feeding system further comprises a so-called "feeding start position detecting switch" which is mounted to the vehicle body. The switch completes the electric circuit from the electric power source to the first connector part when the door comes to a so-called "feeding start position" which is near the half-latch position.

When, due to for example presence of a foreign thing accidentally caught between the door and the vehicle body, the door under closing movement is forced to stop at a position between the half-latch position and the full-close latched position, the motor of the door closing device is automatically stopped due to operation of a suitable safety device.

However, under this halfway condition of the door, the latch plate of the door lock device is prevented from effecting return turning due to quiescence of the door closing device, and thus, the door is locked at such halfway position.

This undesirable matter can be solved by energizing the motor to run in the opposite direction for enforcedly returning the latch plate to its rest position. However, in order to achieve this, the system described in the above-mentioned U.S. Patent Application needs a very troublesome switch manipulation work.

SUMMARY OF THE INVENTION

It is therefore an object of the present invention to provide an automatic door operating system which requires only a simple switch manipulation for returning the latch plate to the rest position when the door is subjected to the above-mentioned undesired locked matter.

According to the present invention, there is provided an automatic door operating system for use in a motor vehicle having a vehicle body and a sliding door. The system comprises a door lock device mounted on the door and including a latch plate, the latch plate having a releasing condition, a half-latch condition and a full-latch condition, the releasing condition being a condition in which the door is released from the vehicle body, the half-latch condition being a condition wherein the door is halfly latched by the vehicle body and the full-latch condition being a condition wherein the door is fully latched by the vehicle body; a door closing device mounted on the door and including an electric motor and a latch plate actuating means, the means enforcedly turning the latch plate in a direction toward the full-latch condition when the electric motor is energized to run in one direction and enforcedly returning the latch plate in the other direction toward the releasing condition when the motor is energized to run in the other direction; a latch plate position detecting switch which detects both the half-latch condition and the full-latch condition of the latch plate; a return recognition switch which detects whether the latch plate actuating means of the door closing device is returned to its rest position or not; a control device which, when the latch plate position detecting switch detects the half-latch condition of the latch plate, energizes the motor to run in the one direction, and which, when the latch plate position detecting switch detects the full-latch condition of the latch plate, energizes the motor to run in the other direction, and which, when the return recognition switch detects the latch plate actuating means having returned to the rest position, stops the rotation of the motor in the other direction; and control means associated with the control device, the control means energizing the motor to run in the other direction for a predetermined time from the time on which the control device is energized.

BRIEF DESCRIPTION OF THE INVENTION

Other objects and advantages of the present invention will become apparent from the following description when taken in conjunction with the accompanying drawings, in which.

DETAILED DESCRIPTION OF THE INVENTION

Figure 1:
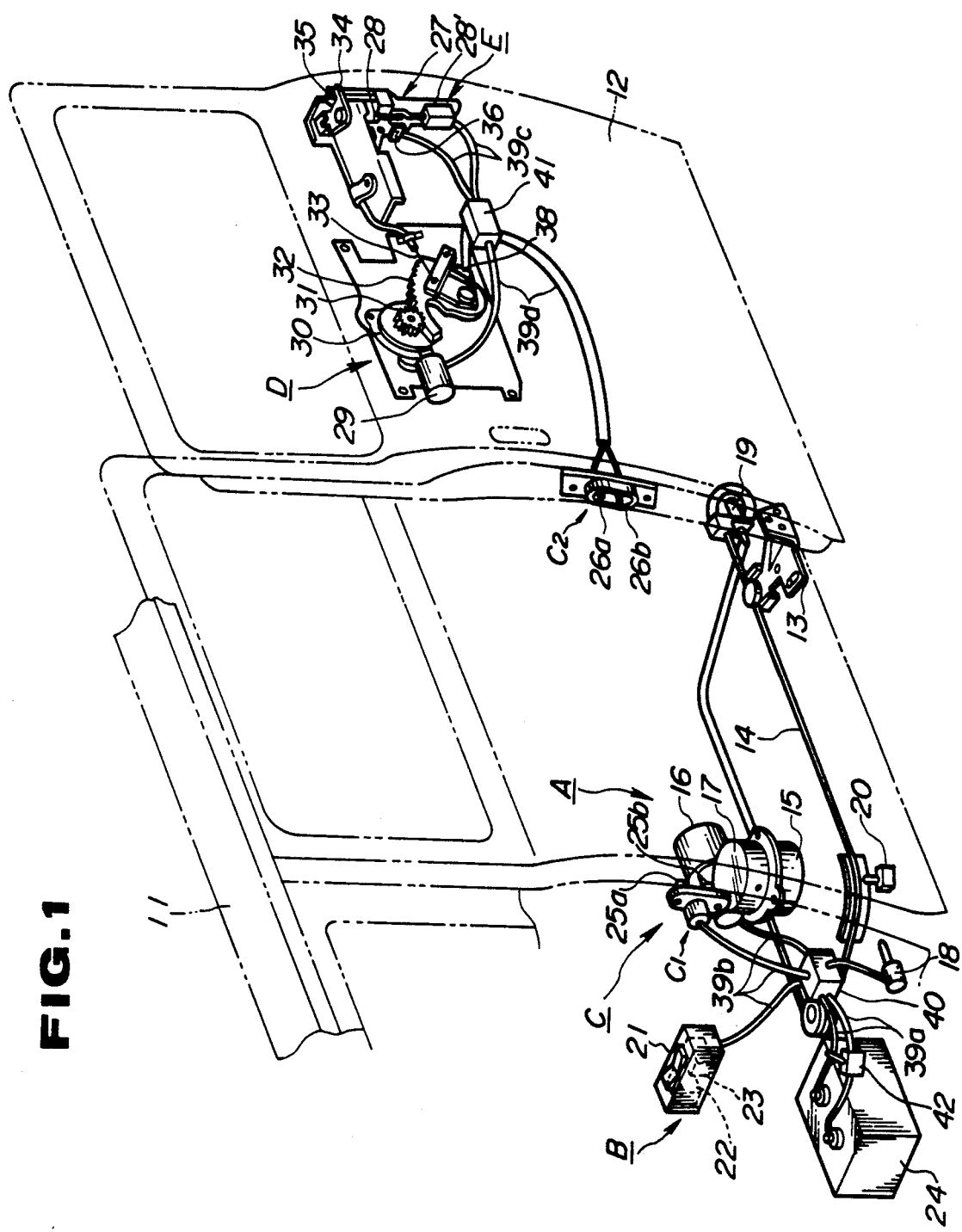
FIG. 1 is a perspective view of a power slide door of a motor vehicle, to which the present invention is applied.

Referring to FIG. 1, there is shown a power slide door of a motor vehicle, to which the present invention is applied.

In the drawings, denoted by numeral 11 is a vehicle body, and denoted by numeral 12 is a slide door. Although not shown in the drawings, a known door guide structure is employed by which a guide way for the door 12 is defined. That is, upon starting of the door opening operation, the door 12 in a full-close position is shifted laterally outward and then moved rearward toward a full-open position. The movement of the door 12 from the full-open position to the full-close position is carried out by travelling the same way in a reversed manner.

As is shown in the drawing, at a lower portion of the vehicle body 11, there is arranged a door moving device "A" by which the door 12 is driven between the full-close position (more specifically, a position very near the full-close position) and the full-open position travelling the guide way defined by the door guide structure.

The door moving device "A" comprises a bracket 13 which is secured to a lower front portion of the door 12. The bracket 13 has a drive cable 14 fixed thereto, which cable has a linear part which extends along the guide way for the door 12. The cable 14 has both end portions wound around a drive drum 15 which is driven by a reversible electric motor 16 through a speed reduction gear 17. Thus, upon energization of the motor 16, the drive drum 15 is rotated in one or the other direction to move the slide door 12 in opening or closing direction along the door guide way.

The door moving device "A" is controlled by a door close detecting switch 18 and a door-open detecting switch 19. The door close detecting switch 18 is of a normally closed type, which is mounted on the vehicle body 11 and turned OFF when the door 12 comes to the full-close position. For this operation, the switch 18 has an antenna pin which is contactable with a front end of the door 12. The door-open detecting switch 19 is of a normally open type, which is mounted on the vehicle body 11 and turned ON when the door 12 comes to the full-open position. Similar to the switch 18, the switch 19 has an antenna pin which is contactable with a rear end of the bracket 13 of the door 12.

It is to be noted that the door 12 can be moved by manual labor. That is, when, with the automatic door operating system being inoperative, the door 12 is manually moved, the drive cable 14 is moved and thus a rotor of the electric motor 16 is forced to rotate through the drive drum 15 and the speed reduction gear 17.

The vehicle body 11 has a so-called "feeding start position detecting switch" 20 mounted thereto. The switch 20 is of a normally open type and so constructed as to close for a moment only when the front end of the slide door 12, during its closing movement, passes by a so-called "feeding start position" which is near an aftermentioned "half-latch" position.

It is to be noted that when the door 12 takes the feeding start position, there is defined a small clearance between the front end of the door 12 and a front end of the door opening, which clearance is so sized as not to permit insertion of an operator's hand thereinto. More specifically, the clearance is somewhat larger than a clearance which is defined when the door 12 assumes the half-latch position.

Designated by reference "B" is a control device which is mounted on the vehicle body 11 at a position near the driver's seat or near the door opening of the vehicle body 11. The control device "B" comprises a seesaw type button switch 21.

The button switch 21 comprises one movable contact and two stationary contacts. The movable contact and one stationary contact constitute a so-called "door opening control switch" 22, while, the movable contact and the other stationary contact constitute a so-called "door closing control switch" 23. That is, when the button is pivoted in one direction, the switch 22 is closed opening the other switch 23, while, when the button is pivoted in the other direction, the switch 23 is closed opening the other switch 22.

Designated by numeral 24 is a battery which serves as an electric power source.

Designated by reference "C" is an electric connector which comprises mutually engageable first and second connector parts C1 and C2 each including two axially movable contact pins 25a and 25b (or, 26a and 26b). Each contact pin is biased to project outward by a spring associated therewith.

The first connector part C1 is mounted on a front end of the door opening having the contact pins 25a and 25b directed rearward and the second connector part C2 is mounted on the front end of the slide door 12 having the contact pins 26a and 26b directed forward.

The first and second connector parts C1 and C2 become engaged to establish an electric connection therebetween when the door 12 closes. More specifically, when the slide door 12 assumes a position between the feeding start position and the full-close position, the contact pins 25a and 25b of the first connector part C1 and the contact pins 26a and 26b of the second connector part C2 are mated. Thus, under this condition, electric power feeding from the battery 24 to after-mentioned electric devices in the slide door 12 is available.

The contact pins 25a and 25b of the first connector part C1, the motor 16, the door-close detecting switch 18, the door-open detecting switch 19, the control device "B", the feeding start position detecting switch 20 and the battery 24 are connected through suitable lead wires 39a and 39b to a body-mounted control unit 40.

Designated by numeral 42 is a battery switch which is arranged in the lead wire 39a between the battery 24 and the control unit 40.

Within the door 12, there is mounted a latch cancelling device "E" which, upon electric energization, cancels the latched condition of the slide door 12 in the full-close latched position. For achieving this latch cancelling operation, the device "E" has an open lever 28 incorporated with the door lock device 27 and a solenoid-spring combination type actuator 28' which is incorporated with the open lever 28. That is, upon energization of the actuator 28', the open lever 28 is pulled in a direction to cancel the latched condition of the door lock device 27. Upon this, the slide door 12 becomes unlatched and thus, thereafter, the opening movement of the door 12 is available.

Within the door 12, there is further mounted a door closing device "D" which is described in U.S. patent application Ser. No. 07/287,277 filed Dec. 21, 1988, now U.S. pat. No. 4,968,074 in the names of Jun YAMAGISHI et al.

The device "D" comprises a reversible electric motor 29, a speed reduction gear 30 driven by the motor 29, a pinion 31 driven by an output shaft of the reduction gear 30 and a sector gear 32 meshed with and thus driven by the pinion 31.

When the motor 29 is energized to run in a normal direction, the sector gear 32 pivots in a counterclockwise direction in FIG. 1 thereby pulling a cable 33 which connects the sector gear 32 with a close lever 34. With this movement, the close lever 34 is pivoted in one direction to turn the latch plate of the door lock device 27 to the full-latch position. With this, the slide door 12 is forced to shift from the half-latch position to the full-close latched position. Designated by numeral 35 is an arm possessed by the latch plate, against which the close lever 34 abuts for the movement of the latch plate.

When, thereafter, the motor 29 is energized to run in the other direction, the sector gear 32 and thus the close lever 34 are moved in the other direction, and finally, they are returned to their original rest positions. The close lever 34 stops at a position remote from the arm 35 of the latch plate. It is to be noted that, under this condition, the full-close latched condition of the door 12 is kept unchanged.

Thus, the sector gear 32, the cable 33 and the close lever 34 constitute a so-called "latch plate actuating means".

Designated by numeral 36 is a latch plate position detecting switch which is mounted on the door lock device 27 to detect both the half-latch and full-latch conditions which the latch plate of the door lock device 27 assumes. For this detecting, the switch 36 has an antenna pin against which the open lever 28 of the door lock device 27 abuts twice when the latch plate of the door lock device 27 is turned from its release position to the full-latch position through the half-latch position.

That is, when the door 12 under closing movement comes to a position just before the half-latch position, a pole (not shown) integral with the open lever 28 is brought into contact with a leading end of one pawl portion of the latch plate causing a first slight movement of the open lever 28 for a first abutment against the antenna pin of the switch 36. When thereafter the door 12 comes to a position just before the full-close latched position, the pole is bought into contact with a leading end of the other pawl portion of the latch plate causing a second slight movement of the open lever 28 for a second abutment against the antenna pin of the switch 36. The first and second abutments of the open lever 28 against the antenna pin allow the switch 36 to detect the half-latch and full-latch conditions of the latch plate of the door lock device 27.

Designated by numeral 38 is a so-called "return recognition switch" which detects whether the sector gear 32 has returned to the rest position or not. The switch 38 is kept OFF when the sector gear 32 is in the rest position in FIG. 1, but turned ON when the sector gear 32 is pivoted away from the rest position.

The motor 29, the latch plate position detecting switch 36, the return recognition switch 38, and the actuator "E" are connected through suitable lead wires 39c to a door-mounted control unit 41. The contact pins 26a and 26b of the second connector part C2 are connected to the control unit 41 through lead wires 39d, as shown.

Figure 2:
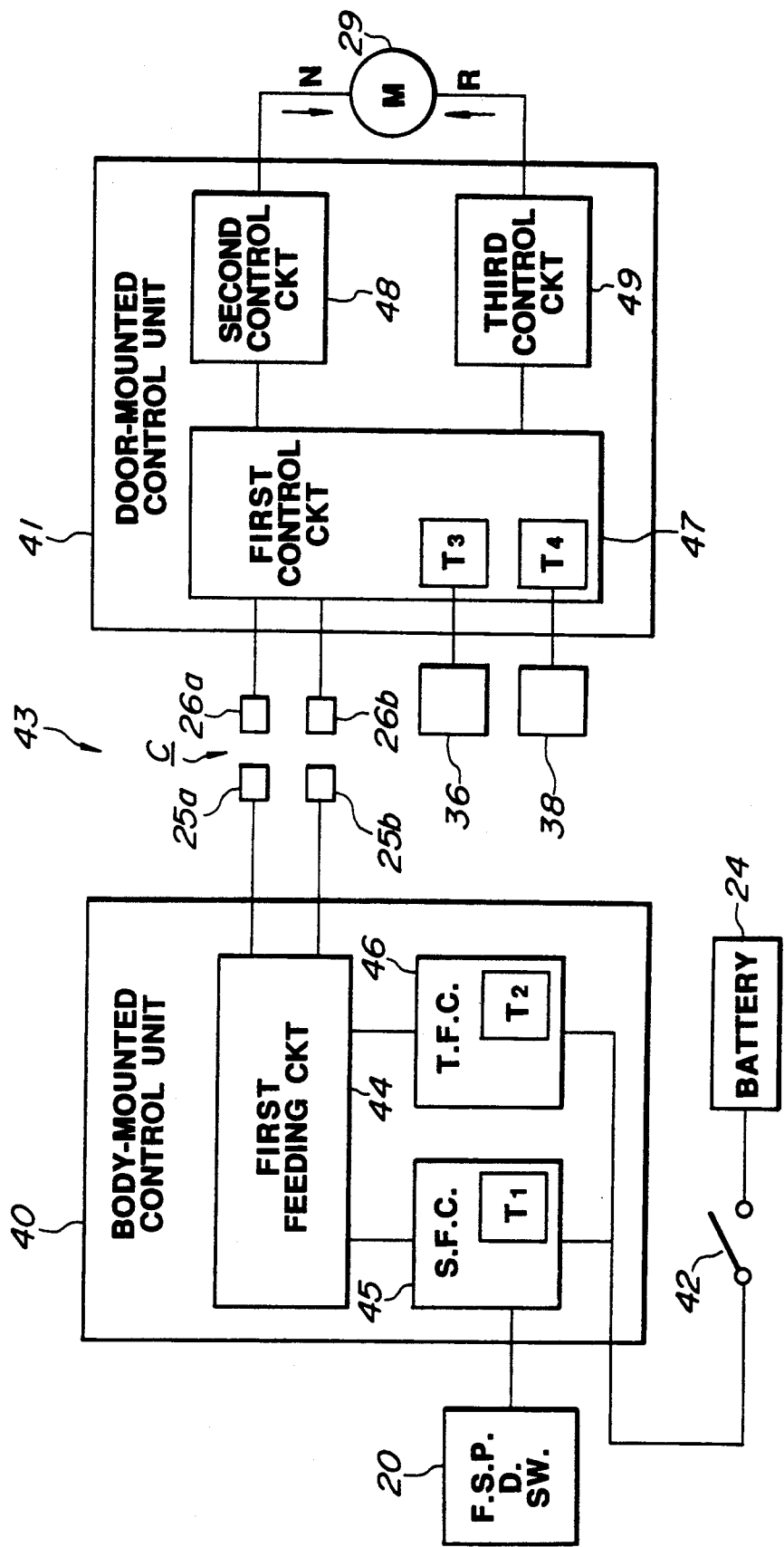
FIG. 2 is a block diagram of a control circuit employed in the present invention.

FIG. 2 is a block diagram showing only circuits of a control system 43, which control the door closing device "D".

The control system 43 comprises generally the body-mounted control unit 40 and the door-mounted control unit 41.

The body-mounted control unit 40 comprises a first feeding circuit 44 which is connected to the contact pins 25a and 25b of the first connector part C1, a second feeding circuit 45 which is connected to the battery 24, the first feeding circuit 44 and the feeding start position detecting switch 20 and a third feeding circuit 46 which is interposed between the battery switch 42 and the first feeding circuit 44 and arranged in parallel with the second feeding circuit 45.

The second feeding circuit 45 includes a timer "T1" which is arranged to start time counting when the feeding start position detecting switch 20 operates due to arrival of the slide door 12, under closing movement, at the feeding start position. That is, upon operation of the switch 20, the timer T1 starts the counting of the time for which the first feeding circuit 44 is kept operated. That is, the operation of the first feeding circuit 44 is maintained for a time determined by the timer T1.

The third feeding circuit 46 is arranged to operate the first feeding circuit 44 for a predetermined time from the time upon which the battery switch 42 is closed.

Figure 3:
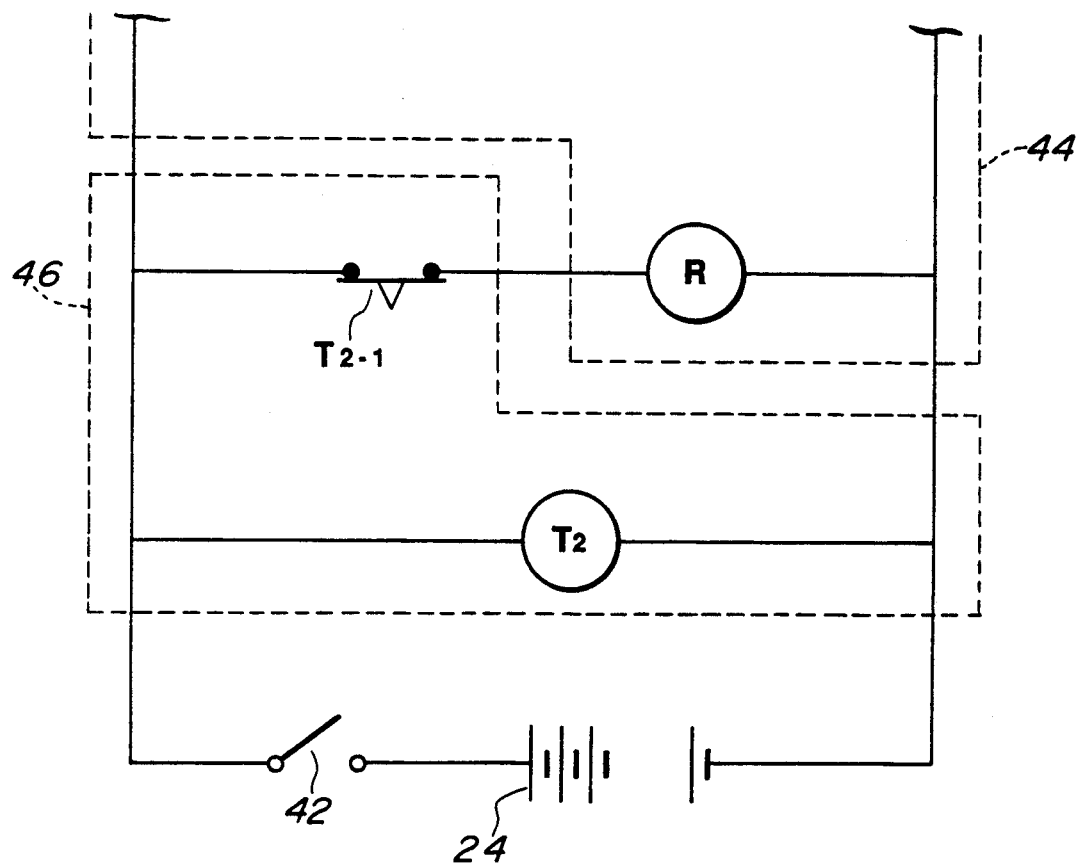
FIG. 3 is a part of the control circuit, which includes various feeding circuits.

The third feeding circuit 46 may be well understood from FIG. 3. The circuit 46 includes a timer "T2" which is connected in series with the battery 24 and the battery switch 42. Designated by reference "R" in FIG. 3 is a feeding relay which is used for operating the motor 29 of the door closing device "D" to run in a reversed direction. A timer contact "T2-1" of the timer T2 is connected in series to the relay "R".

When the first feeding circuit 44 is operated by the second feeding circuit 45, the power feeding from the circuit 44 toward the first connector C1 is so made that the contact pins 25a and 25b are charged positive and negative respectively. While, when the first feeding circuit 44 is operated by the third feeding circuit 46, the power feeding from the circuit 44 toward the first connector C1 is so made that the contact pins 25a and 25b are charged negative and positive respectively. These circuits are described in the afore-mentioned U.S. patent application Ser. No. 07/526,653, now U.S. Pat. No. 5,018,303.

The door-mounted control unit 41 comprises a first control circuit 47 which is connected to the contact pins 26a and 26b of the second connector part C2, the latch plate position detecting switch 36 and the return recognition switch 38, a second control circuit 48 which is connected to the first control circuit 47 and the motor 29 of the door closing device "D" for allowing the motor 29 to run in a normal direction, and a third control circuit 49 which is arranged to operate the motor 29 to run in a reversed direction.

These circuits 47, 48 and 49 may be arranged in substantially the same manner as is described in U.S. patent application Ser. No. 07/526,653, now U.S. Pat. No. 5,018,303.

The first control circuit 47 functions as follows.

That is, when, due to arrival of the door 12 at a certain position, the first and second connector parts C1 and C2 are coupled and the feeding start position detecting switch 20 is actuated to permit the contact pins 25a and 25b of the first connector part C1 to be charged positive and negative, and when, thereafter, due to arrival of the door 12 at the half-latch position, the latch plate position detecting switch 36 is subjected to the first abutment against the open lever 28, the first control circuit 47 operates the second control circuit 48 to energize the motor 29 to run in the normal direction. When, thereafter, upon full closing of the door 12, latch plate position detecting switch 36 is subjected to the second abutment against the open lever 28 due to positioning of the latch plate at the full-latch position, the first control circuit 47 stops the operation of the second control circuit 48 and at the same time operates the third control circuit 49 thereby to energize the motor 29 to run in the reversed direction. When, thereafter, the return recognition switch 38 detects that the sector gear 32 has returned to the original rest position, the first control circuit 47 stops operation of the third control circuit 49 and thus stops the rotation of the motor 29 in the reversed direction.

That is, the first control circuit 47 operates the third control circuit 49 to run the motor 29 in the reversed direction only when, with the first and second connector parts C1 and C2 kept coupled and the contact pins 25a and 25b being charged negative and positive, the return recognition switch 38 detects that the sector gear 32 has taken a position other than the original rest position.

When, after the rotation of the motor 29 in the reversed direction, the return recognition switch 38 detects that the sector gear 32 has returned to the original rest position, the power feeding to the door-mounted devices is stopped and thus the rotation of the motor 29 in the reversed direction stops. The stopping of the motor 29 also takes place when the time determined by the third feeding circuit 46 elapses.

The first control circuit 47 further includes third and fourth timers "T3" and "T4". The timer "T3" functions to stop the energization (viz., rotation in the normal direction) of the motor 29 when the latch plate position detecting switch 36 fails to be subject to the second abutment against the open lever 28 within a given time from the time on which the switch 36 is subjected to the first abutment. The fourth timer "T4" functions to stop the energization (viz., rotation in the reversed direction) of the motor 29 when the return recognition switch 38 fails to detect the sector gear 32 having returned to the original rest position within a given time from the time on which the latch plate position detecting switch 36 is subjected to the second abutment.

In the following, operation of the door closing device "D" will be described with reference to the flowcharts shown in FIGS. 4 and 5.

Figure 4:
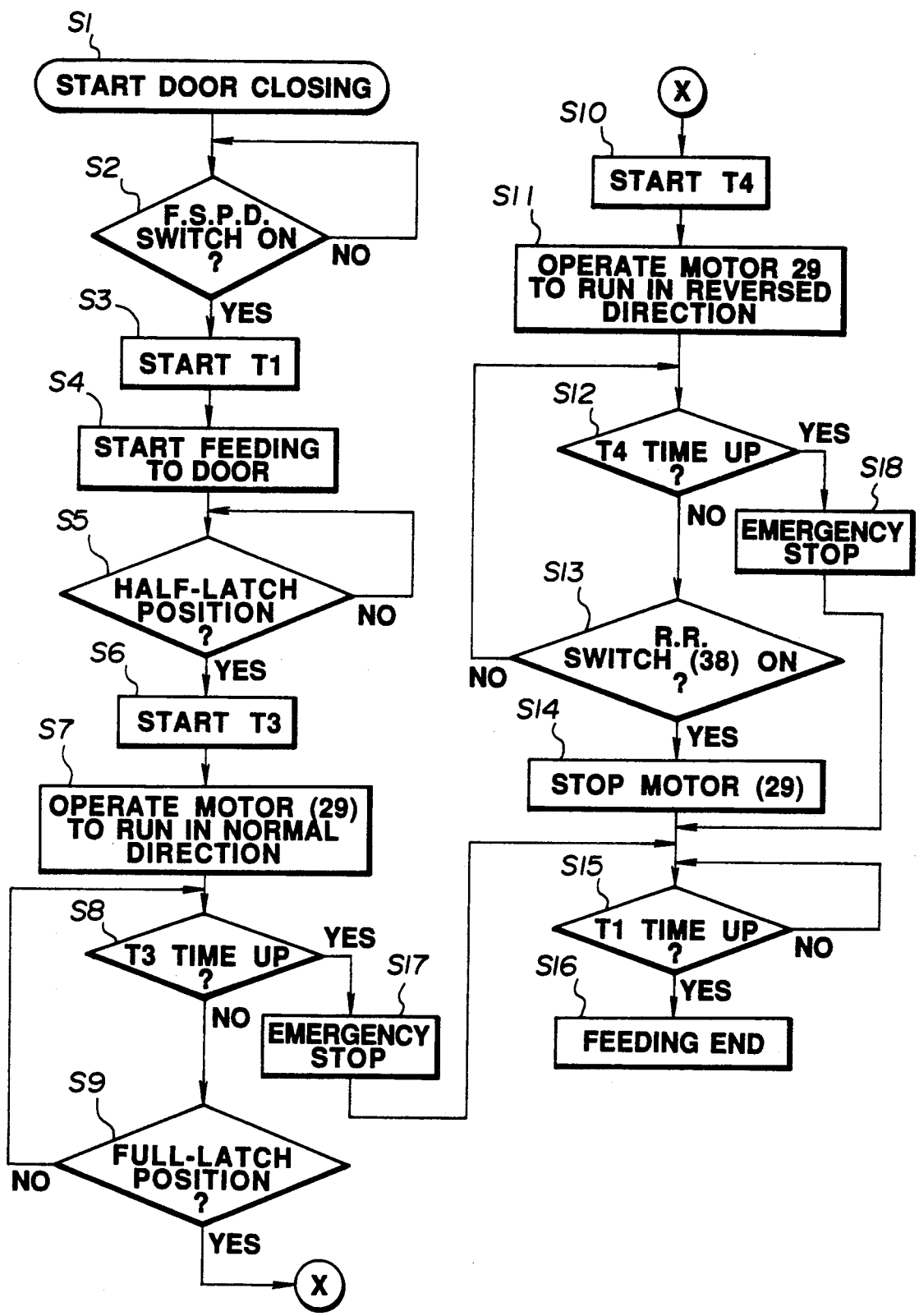
FIG. 4 is a flowchart showing operation steps which are carried out in a computer under normal operation of the automatic door operating system of the invention.
Figure 5:
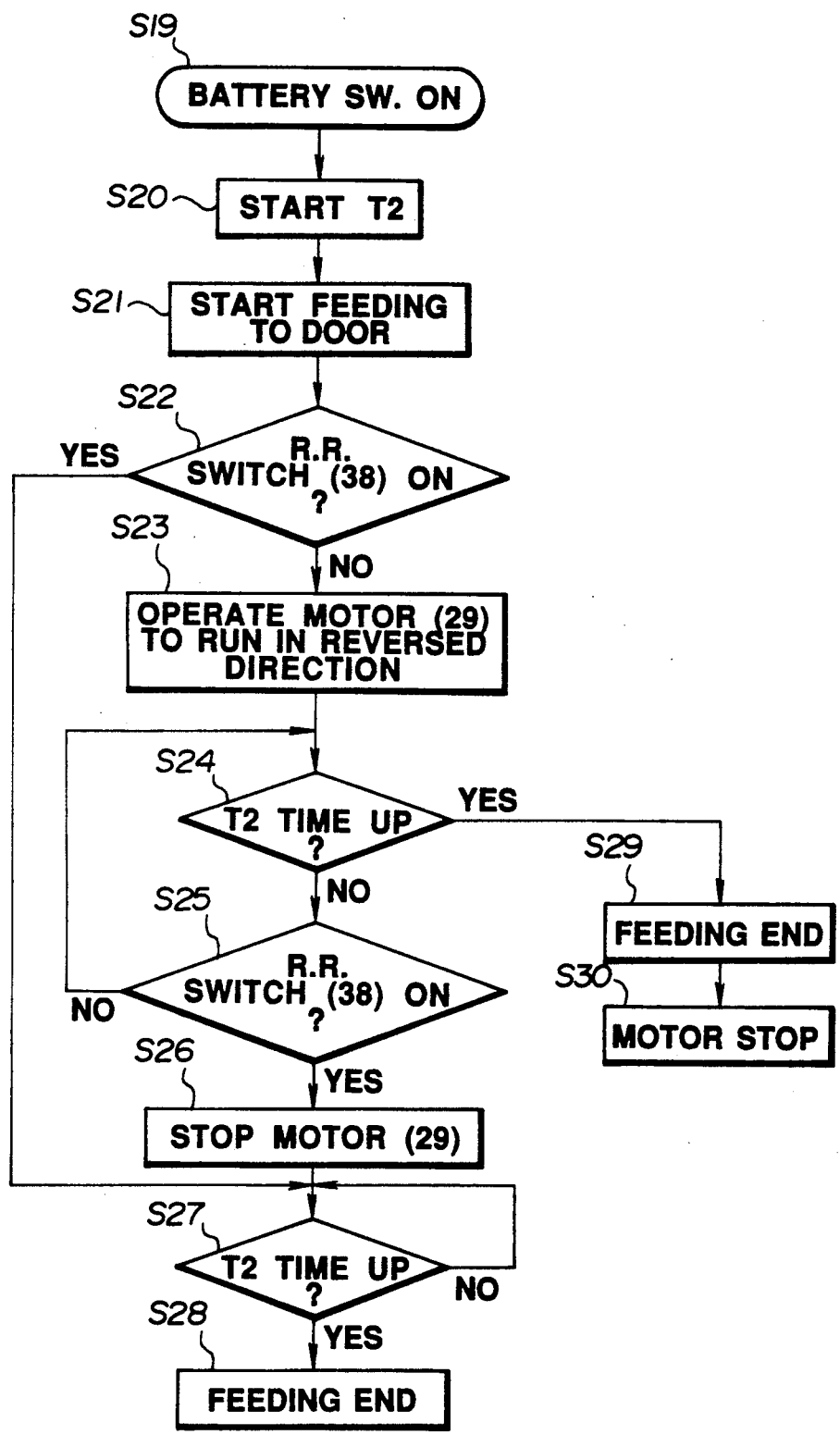
FIG. 5 is a flowchart showing operation steps which are carried out in the computer under abnormal condition of the system of the invention.

FIG. 4 shows an operation which takes place when the automatic door operating system of the invention operates in a normal condition, while, FIG. 5 shows an operation which the system of the invention takes place in an abnormal condition.

First, the operation shown in FIG. 4 will be described.

When, with the door 12 assuming an open position, the door closing control switch 23 of the control device "B" is actuated, the door moving device "A" moves the door 12 in a closing direction (Step 1).

When, during the closing movement of the door 12, the door 12 comes to a position where the first and second connector parts C1 and C2 are operatively coupled and comes to the feeding start position to turn the feeding start position detecting switch 20 ON (Step 2), the timer "T1" starts to count the time (Step 3) and at the same time, power feeding to the door-mounted devices starts (Step 4).

When, thereafter, the door 12 comes to the half-latch position and the half-latch plate position detecting switch 36 is subjected to the first abutment against the open lever 28 and thus turned ON (Step 5), the third timer "T3" starts the time counting (Step 6) and at the same time, the motor 29 of the door closing device "D" is energized to run in the normal direction (Step 7).

With this, due to operation of the door closing device "D", the latch plate is forced to turn toward the full-latch position thereby to shift the door 12 toward the full-close latched position.

When, during the rotation of the motor 29 in the normal direction (viz., within the time determined by the third timer "T3" (Step 8)), the latch plate is turned to the full-latch position (viz., the door 12 is shifted to the full-close latched position) thereby causing the latch plate position detecting switch 36 to be subjected to the second abutment against the open lever 28 (Step 9), the fourth timer "T4" starts the time counting (Step 10). Thus, upon stopping of the rotation of the motor 29 in the normal direction, the motor 29 is reenergized to run in the reversed direction (Step 11).

With the rotation of the motor 29 in the reversed direction, the sector gear 32 and the close lever 34 are turned toward their original rest positions.

When, within the time determined by the fourth timer "T4" (Step 12), the sector gear 32 is returned to the original rest position turning the return recognition switch 38 ON (Step 13), the rotation of the motor 29 in the reversed direction is stopped (Step 14).

When, thereafter, the time determined by the first timer "T1" elapses (Step 15), the power feeding toward the door-mounted devices stops (Step 16).

When, at Step 8, the time determined by the third timer "T3" elapses before the latch plate position detecting switch 36 is subjected to the second abutment against the open lever 28, the rotation of the motor 29 in the normal direction is stopped (Step 17). This is very advantageous when a foreign thing has been accidentally caught between the door 12 and the vehicle body. In fact, the motor 29 can be prevented from the undesired seizuring of the motor 29.

When, at Step 12, the time determined by the fourth timer "T4" elapses before the return recognition switch 38 is turned ON, the rotation of the motor 29 in the reversed direction is stopped (Step 18). Like the third timer "T3", the fourth timer "T4" prevents the motor 29 from the seizuring.

When, due to the emergency stop of the motor 29 at Step 17 or Step 18, the door 12 stops with the latch plate blocked by the close lever 34, the door 12 becomes locked at a position between the half-latch position and the full-close latched position. In fact, under this condition, the door 12 can not be moved by manual labor.

This locked condition of the door 12 can be cancelled by taking the following steps.

That is, as will be seen from the flowchart of FIG. 5, the battery switch 42 is turned OFF and then turned ON (Step 19).

With this, the third feeding circuit 46 operates. That is, the second timer "T2" starts time counting (Step 20) and at the same time, the power feeding to the door-mounted device starts having the contact pins 25a and 25b of the first connector part C1 charged negative and positive (Step 21).

When, under this condition, the return recognition switch 38 detects that the sector gear 32 has taken a position other than the original rest position (Step 22), the motor 29 is energized to run in the reversed direction (Step 23).

When, thereafter, within the time determined by the second timer "T2" (Step 24), the sector gear 32 is returned to original rest position causing operation of the return recognition switch 38 (Step 25), the rotation of the motor 29 in the reversed direction is stopped (Step 26). When, thereafter, the time determined by the second timer "T2" elapses (Step 27), the power feeding toward the door-mounted devices stops (Step 28).

When, at Step 22, the return recognition switch 38 detects that the sector gear 32 has returned to the original rest position, rotation of the motor 29 in the reversed direction does not take place. That is, in such condition, the power feeding toward the door-mounted devices is stopped at the time when the time determined by the second timer "T2" elapses (Step 28).

Furthermore, when, at Step 24, the time determined by the second timer "T2" elapses before the return recognition switch 38 is operated, the power feeding toward the door-mounted devices is stopped (Step 29) and at the same time, the rotation of the motor 29 in the reversed direction is stopped (Step 30).

As will be understood from the foregoing description, the automatic door operating system has the following advantage.

That is, when, for some reason (for example, a foreign thing accidentally caught between the door 12 and the vehicle body 11), the door closing device "D" stops during its door closing operation and the door 12 becomes locked at a position between the half-latch position and the full-close latched position, only the following simple manual operating is taken for refitting the door 12.

That is, first, the battery switch 42 is turned OFF and then turned ON. With this, the motor 29 of the door closing device "D" is forced to run in the reversed direction and thus the sector gear 32 is turned to the original rest position. Under this condition, the foreign thin can be easily removed.

What is claimed is:

1. An automatic door operating system for use in a motor vehicle having a vehicle body and a sliding door, comprising:
    a door lock device mounted on said door and including a latch plate having a releasing condition, a half-latch condition and a full-latch condition, said releasing condition being a condition in which said door is released from the vehicle body, said half-latch condition being a condition wherein said door is incompletely latched by said vehicle body and said full-latch condition being a condition wherein said door is fully latched by said vehicle body;
    a door closing device mounted on said door and including an electric motor, and latch plate actuating means operatively connected to said motor, for enforcedly turning said latch plate in a direction toward said full-latch condition when said electric motor is energized to run in a first direction and for allowing said latch plate to be returned in another direction toward said releasing condition when said motor is energized to run in a second direction such that said latch plate actuating means moves toward a rest position;
    a latch plate position detecting switch which detects both the half-latch condition and the full-latch condition of said latch plate;
    a return recognition switch which detects whether said latch plate actuating means of said door closing device is returned to said rest position;
    a control device which, when said latch plate position detecting switch detects the half-latch condition of said latch plate, energizes said motor to run in said first direction, and which, when said latch plate position detecting switch detects the full-latch condition of said latch plate, energizes said motor to run in said second direction, and which, when said return recognition switch detects the latch plate actuating means having returned to said rest position, stops the rotation of said motor in said second direction, said control device starting its control operation when electrically energized;
    a manually operated switch having an ON position and an OFF position for selectively energizing and deenergizing said control device, respectively; and
    control means for energizing said motor to run in said second direction for a predetermined time when said manually operated switch is successively moved into OFF and ON positions such that said latch plate is returned to said releasing condition.

2. An automatic door operating system as claimed in claim 1, in which said control means comprises:
    a power feeding circuit for feeding said door closing device with electric power when electrically energized; and
    a timer connected to said manually operated switch and said power feeding circuit for electrically energizing said power feeding circuit for said predetermined time from the time when said manually operated switch is turned from the OFF position to the ON position.

3. An automatic door operating system as claimed in claim 2, in which said timer has a timer contact which is connected in series with a relay which is arranged to allow the motor to run in said second direction.

4. An automatic door operating system as claimed in claim 3, in which said control means further comprises another time which said control means further comprises another time which determines the time within which said latch plate position detecting switch should finish the operation for detecting the full-latch condition of said latch plate.

5. An automatic door operating system as claimed in claim 4, in which said control means energizes said motor to run in said second direction when the time determined by said another timer elapses before said latch plate position detecting switch detects the full-latch condition of said latch plate.

6. An automatic door operating system as claimed in claim 5, in which said control means further comprises a still another timer which determines the time for which said return recognition switch should finish the operation for detecting the rest position of said latch plate actuating means of said door closing device.

7. An automatic door operating system as claimed in claim 6, in which said control means stops the operation of said motor in said second direction when the time determined by said still another timer elapses before the return recognition switch detects the rest position of said latch plate actuating means.

8. An automatic door operating system as claimed in claim 1, further comprising a motor, which is different from said electric motor, for moving said door between a fully opened position and a fully closed position.

* * * * *